May 11, 1954 — Q. G. McDANIEL — 2,678,112
AUTOMATIC CHAIN LUBRICATOR
Filed Jan. 14, 1952 — 3 Sheets-Sheet 1
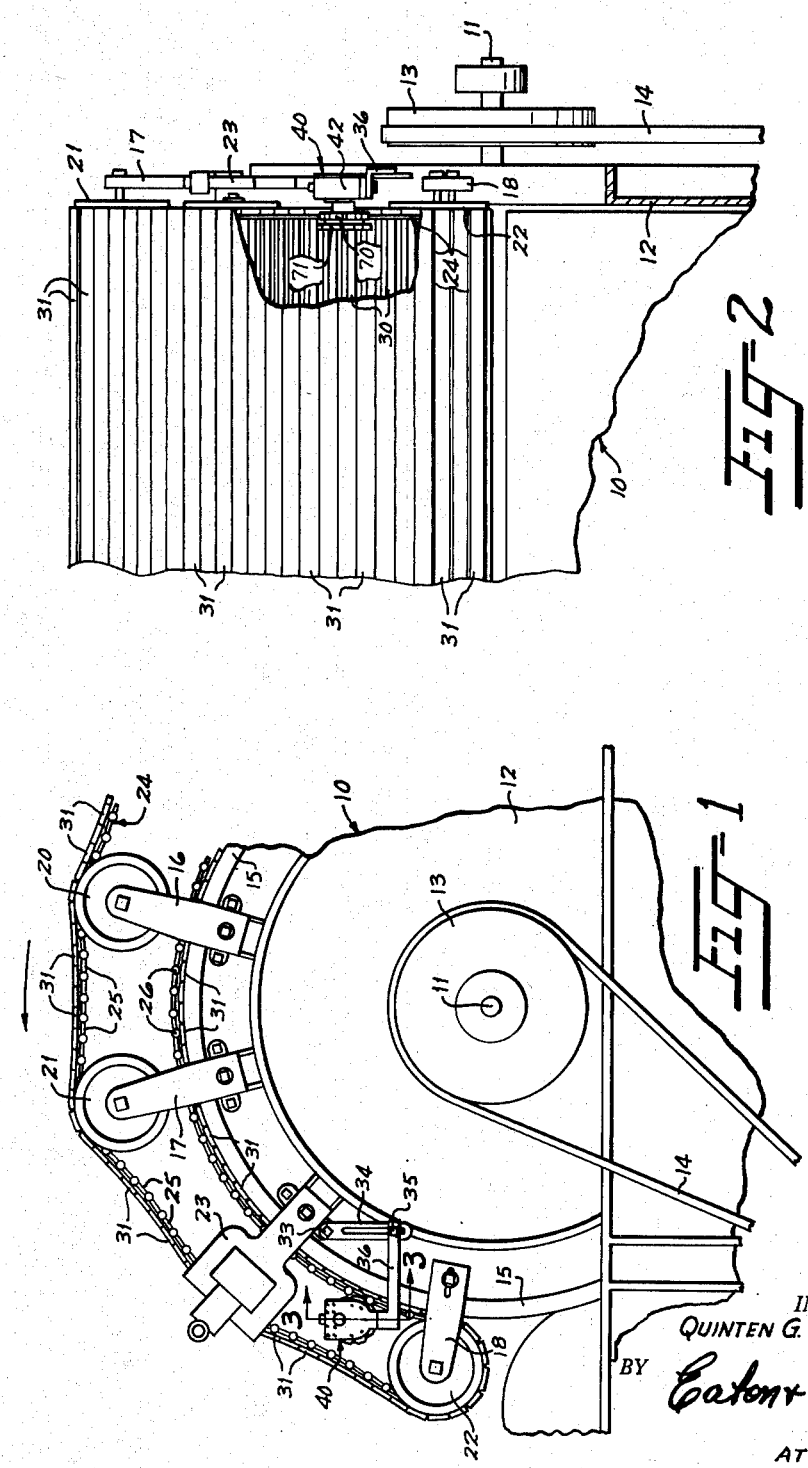
INVENTOR:
QUINTEN G. McDANIEL.
BY Eaton + Bell
ATTORNEYS.

May 11, 1954 — Q. G. McDANIEL — 2,678,112
AUTOMATIC CHAIN LUBRICATOR
Filed Jan. 14, 1952 — 3 Sheets-Sheet 2
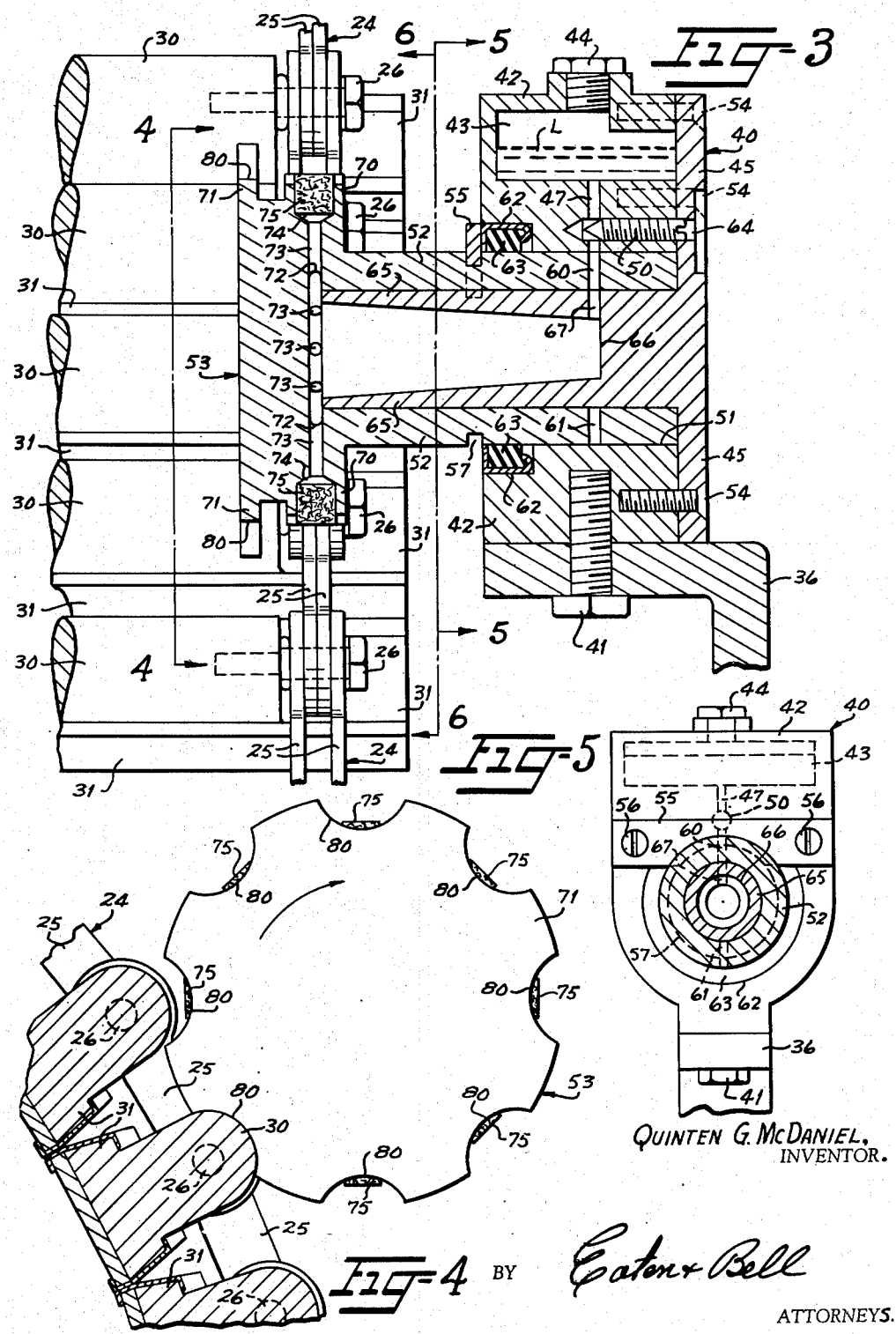
Quinten G. McDaniel,
INVENTOR.
BY Eaton + Bell
ATTORNEYS.

May 11, 1954   Q. G. McDANIEL   2,678,112
AUTOMATIC CHAIN LUBRICATOR
Filed Jan. 14, 1952   3 Sheets-Sheet 3
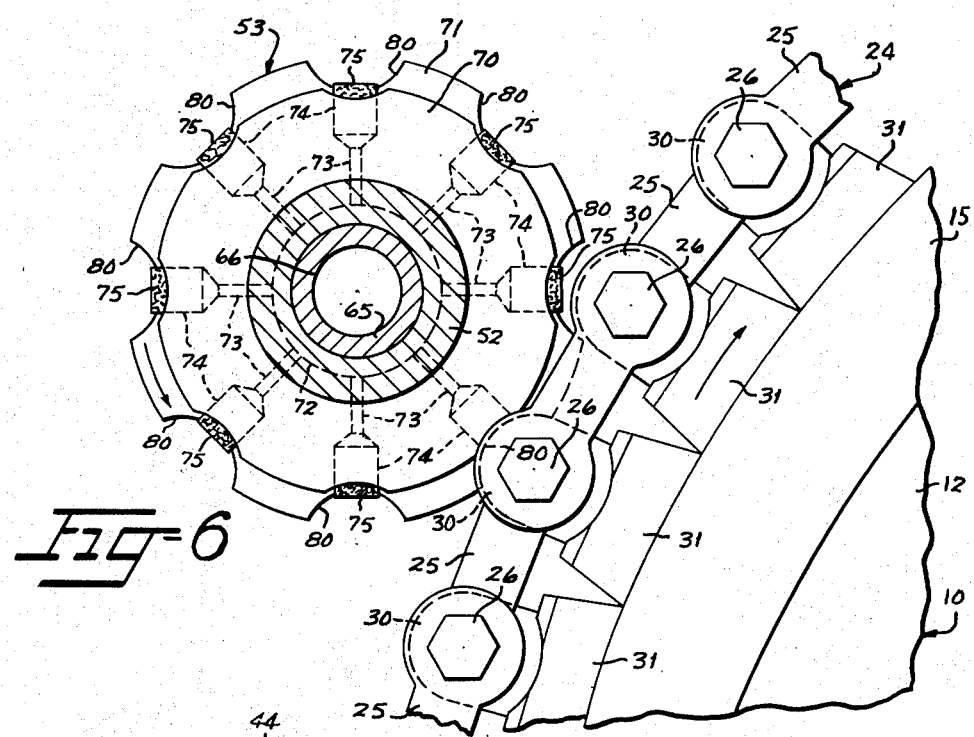
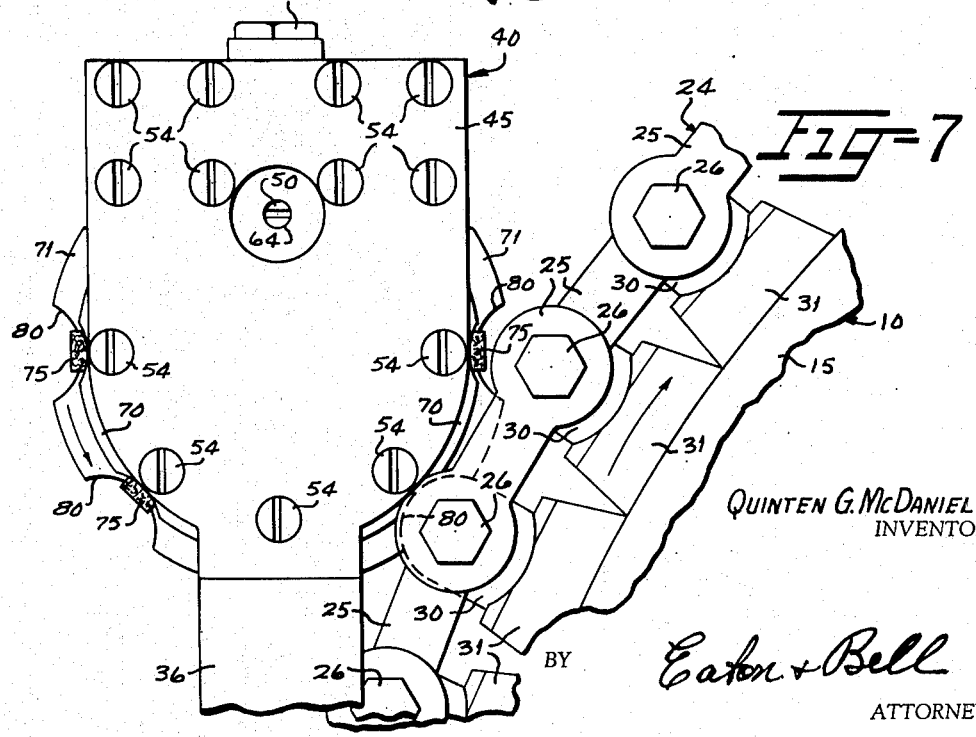
Quinten G. McDaniel,
INVENTOR.
BY Eaton & Bell
ATTORNEYS.

Patented May 11, 1954

2,678,112

UNITED STATES PATENT OFFICE 2,678,112

AUTOMATIC CHAIN LUBRICATOR

Quinten G. McDaniel, Concord, N. C., assignor of twenty per cent to W. G. Jarrell Machine Co., Charlotte, N. C., a corporation of North Carolina, twenty per cent to R. P. Bullard and thirty per cent to W. W. Jarrell, twenty per cent to Mrs. Margaret J. Cruse, and ten per cent to R. K. Jarrell, all of Charlotte, N. C.

Application January 14, 1952, Serial No. 266,367

8 Claims. (Cl. 184—15)

1

This invention relates to a chain lubricator and more specifically to a novel chain lubricator for lubricating the flat chain of a revolving flat carding machine.

Heretofore, it has been the practice to lubricate the flat chain of a carding machine by hand which frequently resulted in the lubricant not being evenly distributed thus causing uneven wear on the flat chain, and in many cases, too much lubricant was put onto the chain so that some lubricant would spread onto the flats and onto the fibers being processed to damage the same.

It is, therefore, an object of this invention to provide a chain lubricator which can be readily and easily mounted on a carding machine to supply an even and efficient distribution of the lubricant to the card flat chain.

It is another object of this invention to provide a lubricator for a carding machine having a lubricating sprocket having lubrication ports therein which lubricating sprocket rides on the flat chain and also having a driving sprocket fixedly mounted on the lubricating sprocket and having notches therein adapted to engage the ribbed portion of the card flats for rotating the driving sprockets and the lubricating sprocket. The lubricating sprocket with the lubricating ports therein has lubricant fed thereto from a reservoir at a predetermined rate.

It is another object of this invention to provide a card flat chain lubricator comprising a housing and means for adjustably mounting said housing on a carding machine, said housing containing a reservoir adapted to contain a fluid or semi-fluid lubricant, a sprocket assembly having a hub portion rotatably mounted in said housing, said sprocket assembly having a driving sprocket adapted to mesh with said card flats and to be driven thereby and a lubricating sprocket having means therein for lubricating said chain and means for directing lubricant from said reservoir to said lubricating sprocket.

Some of the objects of the invention having been stated, other objects will appear as the description proceeds when taken in connection with the accompanying drawings, in which—

Figure 1 is a side elevation of a portion of a revolving flat carding machine showing the card flat chain lubricator mounted thereon;

Figure 2 is an elevation looking at the left-hand side of Figure 1 with some of the parts broken away;

Figure 3 is an enlarged vertical sectional view of the lubricator taken substantially along the

2 line 3—3 in Figure 1 and showing parts of the carding machine in elevation;

Figure 4 is a vertical sectional view taken substantially along the line 4—4 in Figure 3 and illustrating the manner in which the driving sprocket is driven;

Fgure 5 is a vertical sectional view of the lubricator on a reduced scale and being taken substantially along the line 5—5 in Figure 3;

Figure 6 is a vertical sectional view taken substantially along the line 6—6 in Figure 3;

Figure 7 is an enlarged fragmentary elevation of the central left-hand portion of Figure 1 and showing the flat chain lubricator and a portion of the flat chain.

Referring more specifically to the drawings, the numeral 10 broadly designates a conventional carding machine having a cylinder driving shaft 11 rotatably mounted in a side frame 12 and having a cylinder driving pulley 13 fixedly mounted thereon which is driven in a conventional manner, not shown, by a belt 14. The side frame 12 has adjustably mounted thereon, in a conventional manner, a band 15, the purpose of which will be presently described. The side frame 12 also has a plurality of top flat carrier stands 16, 17 and 18 adjustably mounted thereon in a conventional manner which rotatably support chain idler guide pulleys 20, 21 and 22, respectively. Also, adjustably secured on the side frame 12 is a traverse grinder stand 23.

A card flat chain broadly referred to at 24 comprises a plurality of links 25 which are pivotally interconnected by shoulder screws 26. The shoulder screws 26 pass through the flat chain links 25 and are each threadably embedded in a rib portion 30 of a card flat 31. The outer ends of the card flats 31 are milled down to slidably engage and conform with the band 15 as the flats move along their lower reach and to engage the chain idler guide pulleys 20, 21 and 22, as the flats move along their upper reach in a conventional manner, well known to those familiar with the art of carding fibers.

The parts heretofore described are conventional parts of a Whitin revolving flat carding machine and it is with these parts that the invention is particularly adapted to be associated although it is to be understood that the invention is not limited to use with the machine illustrated and it may be used on various other chains or other carding machines, the present carding machine being shown for purposes of illustration only.

Fixedly secured to the traverse grinder stand holding bolt as at 33 is a downwardly extending slotted support arm 34 (Figure 1) in the lower end of which a horizontally disposed lubricator support arm 36 is adjustably secured as at 35. The support arm 36 extends to the left in Figure 1 and has a laterally extending portion to which the novel flat chain lubricator broadly designated at 40 is secured as by a screw 41. The flat chain lubricator 40 comprises a reservoir housing 42 having a reservoir 43 therein which is closed by a plug 44 at the top or intake portion thereof and the housing 42 is also provided with a cover plate 45, to be presently described. The reservoir 43 is adapted to contain a suitable lubricant L which is preferably fluid or semi-fluid such as oil.

The reservoir 43 has a communicating port or passage 47 leading therefrom in which the flow of lubricant may be restricted by a metering needle valve 50 which is threadably mounted in the reservoir housing 42 (Figure 3). The reservoir housing 42 has a bore 51 extending therethrough in which the outer portion of a sleeve 52, of a lubricating sprocket assembly broadly referred to at 53, is rotatably mounted. The sleeve 52 is prevented from moving longitudinally in said housing in one direction by the cover plate 45 which is fixedly secured to the reservoir housing 42 by a plurality of screws 54 and longitudinal movement in the housing in the other direction is prevented by a retaining plate 55 (Figures 3 and 5) which is fixedly secured to the reservoir housing 42 as by screws 56.

The lower central portion of the retaining plate 55 is provided with an arcuate notch adapted to mate with the bottom of an annular groove 57 which is cut in the outer periphery of the sleeve 52 of the lubricating sprocket assembly 53.

The sleeve 52 of the lubricating sprocket assembly 53 has a pair of lubrication ports or passages 60 and 61 which are in vertical alinement with the lubrication port 47 in the reservoir housing 42 and as the sleeve 52 of the lubricating sprocket assembly 53 rotates in the manner to be presently described, the passages 60 and 61 are alternately brought into radial alinement with the passage 47.

The bore 51 in the reservoir housing 42 is provided with an enlarged annular groove 62 in which an oil seal 63 is mounted as by a pressed fit in order to prevent lubricant passing from the passage 47 from escaping as the sleeve 52 rotates in the bore 51 of the reservoir housing 42.

The cover 45 is of irregular shape and is provided with an opening 64 therein in alinement with the needle valve 50 to provide an opening through which the needle valve 50 may be adjusted to regulate the flow of lubricant through the passage 47. Integral with the cover plate 45 is a hub portion 65 having a tapered hollow center or opening 66 therein. The outer diameter of the hub portion 65 conforms to the inner diameter of the sleeve 52 and the sleeve 52 is rotatably mounted on the hub portion 65. The opening 66 in the hub 65 extends to a point in alinement with the passageway 60 in the sleeve 52. The hub 65 has a radially extending passageway 67 therein communicating with the opening 66 and the passageway 67 is, for a short period of time during each revolution of the lubricating sprocket assembly 53, in radial alinement with one of the passageways 60 or 61 in the sleeve 52 of the lubricating sprocket assembly and the passageway 47.

The sleeve 52 of the lubricating sprocket assembly 53 has integral with its inner end a composite gear comprising a lubricating sprocket 70 and a driving sprocket 71. The lubricating sprocket 70 is provided with an annular distributing groove 72 from which a plurality of radially extending ports or passageways 73 extend, each of which has an enlarged portion 74 near its outer end (Figure 6).

The enlarged portion 74 of each passageway 73 has a felt plug or wick 75 secured therein as by a pressed fit, the purpose of which is to prevent lubricant from escaping from the passageway 73 onto the flat chain 24 except during the time that the passageway 73 is in alinement with and the felt plug 75 is in engagement with the chain links 25 of the flat chain 24 and the felt plug 75 also serves as a metering device to insure even distribution of said lubricant.

The driving sprocket 71 is provided with a plurality of cavities or notches 80 which are of the same curvature as the top of the rib portions 30 of the card flats 31 and are so spaced apart from each other that as the flat chain 24 along with the card flats 31 moves past the chain lubricator 40, the rib portions 30 of the card flats 31 will engage the notches 80 in the driving sprocket 71 to thus impart rotation to the driving sprocket 71 along with the lubricating sprocket 70.

It is thus seen that at two times during each revolution of the lubricating sprocket assembly 53, the lubricating passages 47 and 67 and one of the passages 60 or 61 will be in radial alinement to allow the lubricant in the reservoir 49 to flow from the reservoir 43 to opening 66 in the hub 65 to the distributing groove 72 through the radially extending passages and to the felt plugs 75 to thereby keep the felt plugs 75 saturated to the degree desired, by adjustment of the needle valve 50.

It is thus seen that as the driving sprocket 71 drives the lubricating sprocket 70, the felt plugs 75 in the lubricating sprocket 70 will engage the juncture of each of the links 25 of the flat chain 24 to thus be squeezed thereby and release the desired amount of oil or other lubricant on each of these juncture points to keep the flat chain 24 well oiled to thereby reduce the amount of wear on these parts and to keep the flat chain and the card flats operating efficiently.

Although the novel card flat lubricator is shown as being mounted on the traverse grinder stand 22, it is to be understood that the lubricator may be mounted on one of the top flat carrier stands, the adjustable feature of the mounting 34—36 being for this purpose. If desired, a novel lubricator may be mounted on each carding machine, or a single lubricator may be moved from machine to machine periodically as desired.

Throughout the drawings and specification, the invention has been shown and described as being mounted on one side of the machine, but it is evident that one of the lubricators would also be mounted on the other side of the machine, since each end of the card flats are secured to a chain. The only change necessary in placing the apparatus on the other side of the machine would be to reverse the position of the bracket 36.

In the drawings and specification, there has been set forth a preferred embodiment of the invention and although specific terms are employed, they are used in a generic and descriptive sense only and not for purposes of limitation, the scope of the invention being defined in the claims.

I claim:
1. A card flat chain lubricator for carding ma- chines comprising a housing mounted on said carding machine and having a lubricant reservoir therein, a sprocket assembly rotatably mounted in said housing and comprising a driven sprocket adapted to mesh with and be driven by the card flats of said carding machine and a lubricating sprocket having a plurality of cavities circumferentially spaced in the outer periphery thereof adapted to register with portions of said card flat chain, said lubricating sprocket having an internal bore therein and a plurality of radially extending passageways connecting said cavities with said internal bore, each of said radially extending passageways being enlarged at the outer end thereof and having a wick positioned in the enlarged portion thereof, and means for directing lubricant from said reservoir to said internal bore and said passageways in said lubricating sprocket.

2. A card flat chain lubricator for carding machines comprising a housing, means for adjustably mounting said housing on a carding machine, said housing containing a lubricant reservoir and being provided with a bore therein, said housing having a first passageway connecting said reservoir with said bore, a sprocket assembly comprising a hollow sleeve portion rotatably mounted in said bore and a driven sprocket and a lubricating sprocket, said driven sprocket being adapted to mesh with the card flats of said carding machine and be driven thereby and said lubricating sprocket having a plurality of cavities therein adapted to coincide with portions of said card flat chain, said lubricating sprocket having an internal bore therein communicating with the interior of said hollow sleeve portion, said lubricating sprocket having a plurality of radially extending passageways connecting said cavities with said internal bore and said sleeve portion having at least one passageway therein adapted to at times register with the first-named passageway in said housing to permit lubricant from said reservoir to flow into the hollow portion of said sleeve and outwardly through the radially extending passageways in said lubricating sprocket.

3. A card flat chain lubricator for carding machines comprising a housing, means for adjustably mounting said housing on a carding machine, said housing containing a lubricant reservoir in the upper portion thereof and being provided with an axial bore therein spaced below said reservoir, said housing having a first passageway connecting said reservoir with said bore, a sprocket assembly comprising a hollow sleeve portion rotatably mounted in said bore and having a driven sprocket and a lubricating sprocket integral therewith, said driven sprocket being adapted to mesh with the card flats of said carding machine and be driven thereby and said lubricating sprocket having a plurality of circumferentially spaced cavities in the outer periphery thereof adapted to coincide with portions of said card flat chain, said lubricating sprocket having an internal bore therein communicating with the interior of the hollow sleeve portion, said lubricating sprocket having a plurality of radially extending passageways connecting said cavities with said internal bore and said hollow sleeve portion having at least one passageway therein adapted to at times register with the first-named passageway in said housing to permit lubricant to flow by gravity from said reservoir into the interior of said sleeve and outwardly through the radially extending passageways of said lubricating sprocket and each of said cavities in said lubricating sprocket having a wick therein for applying lubricant to said card flat chain.

4. A card flat chain lubricator for carding machines comprising a housing, means for adjustably mounting said housing on a carding machine, said housing containing a lubricant reservoir in the upper portion thereof and being provided with a bore therein spaced below said reservoir, said housing having a first passageway connecting said reservoir with said bore, a needle valve in said first passageway for controlling the amount of lubricant flowing therethrough, a sprocket assembly comprising a hollow sleeve portion rotatably mounted in said bore and having a driven sprocket and a lubricating sprocket integral therewith, said driven sprocket being adapted to mesh with the card flats of said carding machine and be driven thereby and said lubricating sprocket wheel having a plurality of semi-circular circumferentially spaced cavities therein adapted to coincide with portions of said card flat chain, said lubricating sprocket having an annular groove therein communicating with the interior of said hollow sleeve, said lubricating sprocket having a plurality of radially extending passageways connecting said cavities with said annular groove and said sleeve portion having at least one passageway therein adapted to at times register with the first-named passageway in said housing to permit lubricant to flow by gravity from said reservoir into the bore in said hub and outwardly through the radially extending passageways of said lubricating sprocket.

5. A card flat chain lubricator for carding machines comprising a housing, means for mounting said housing on a carding machine, said housing having a lubricant reservoir therein, said housing also being provided with a bore extending therethrough, sprocket assembly having a hollow sleeve portion and a driven sprocket and a lubricating sprocket integral therewith, the hollow sleeve portion of said sprocket assembly being rotatably mounted in the bore in said housing to position the sprocket assembly on one side of the housing, a plate secured to the other side of said housing having a hub portion projecting into the hollow interior of said sleeve portion to permit the sleeve portion to rotate on the hub portion of said plate, said hub portion of said plate having a tapered bore therein, said driven sprocket having means adapted to mesh with the card flats on said carding machine for driving said sprocket, said lubricating sprocket having an internal groove therein communicating with the tapered bore in said hub portion and a plurality of cavities adjacent the outer periphery thereof adapted to be positioned adjacent portions of the card flat chain, said lubricating sprocket also having a plurality of radially extending passageways connecting said internal groove with said cavities, and passageways in said housing, said sleeve portion of said sprocket assembly and in said hub portion of said plate permitting lubricant to be directed from the reservoir to the radially extending passageways of said lubricating sprocket and outwardly onto the card flat chain.

6. A card flat chain lubricator for carding machines comprising a housing, means for mounting said housing on a carding machine, said housing having a lubricant reservoir therein, said housing also being provided with a bore extending therethrough, sprocket assembly having a hollow sleeve portion and a driven sprocket and a lubricating sprocket integral therewith the sleeve portion of said sprocket assembly being rotatably mounted in the bore in said housing to support the sprocket assembly on one side of said housing, a plate secured to the other side of said housing and having a hub portion projecting into the hollow interior of said sleeve portion to permit the sleeve portion to rotate thereon, said hub portion of said plate having a tapered bore therein, said driven sprocket wheel being adapted to mesh with card flats on said carding machine for rotating said sprocket assembly, said lubricating sprocket having an internal groove therein communicating with the tapered bore in said hub portion and a plurality of circumferentially spaced cavities in the outer periphery thereof adapted to be positioned adjacent portions of the card flat chain, each of said cavities having a wick therein, said lubricating sprocket also having a plurality of radially extending passageways connecting said internal groove with said cavities, and passageways in said housing, said sleeve portion of said sprocket assembly and in said hub portion of said plate permitting lubricant to be directed from the reservoir to the radially extending passageways of said lubricating sprocket and outwardly to the wicks in said cavities to thus be applied to the card flat chains as the sprocket assembly rotates.

7. A card flat chain lubricator for carding machines comprising a housing, means for mounting said housing on a carding machine, said housing having a lubricant reservoir therein, said housing also being provided with a bore extending therethrough, sprocket assembly having a hollow sleeve portion and a driven sprocket and a lubricating sprocket integral therewith the sleeve portion of said sprocket assembly being rotatably mounted in the bore in said housing to support the sprocket assembly on one side of said housing, a plate secured to the other side of said housing and having a hub portion projecting into the hollow interior of said sleeve portion to permit the sleeve portion to rotate thereon, said hub portion of said plate having a tapered bore therein, said driven sprocket wheel being adapted to mesh with card flats on said carding machine for rotating said sprocket assembly, said lubricating sprocket having an internal groove therein communicating with the tapered bore in said hub portion and a plurality of circumferentially spaced cavities in the outer periphery thereof adapted to be positioned adjacent the card flat chain, each of said cavities having a wick therein, said lubricating sprocket also having a plurality of radially extending passageways connecting said internal groove with said cavities, said housing having a first passageway therein communicating with said reservoir and with said bore extending through the housing, said sleeve portion of said sprocket assembly having at least one second passageway therein adapted at spaced intervals of time to register with said first passageway and said hub portion having a third passageway therein in alinement with the second passageway and communicating with said tapered bore to permit lubricant to flow into said radially extending passageways in said lubricating sprocket for delivery onto said card flat chain.

8. A card flat chain lubricator for carding machines comprising a housing, means for mounting said housing on a carding machine, said housing having a lubricant reservoir therein, said housing also being provided with a bore extending therethrough, sprocket assembly having a hollow sleeve portion and a driven sprocket and a lubricating sprocket integral therewith the sleeve portion of said sprocket assembly being rotatably mounted in the bore in said housing to support the sprocket assembly on one side of said housing, a plate secured to the other side of said housing and having a hub portion projecting into the hollow interior of said sleeve portion to permit the sleeve portion to rotate thereon, said hub portion of said plate having a tapered bore therein, said driven sprocket wheel being adapted to mesh with card flats on said carding machine for rotating said sprocket assembly, said lubricating sprocket having an internal groove therein communicating with the tapered bore in said hub portion and a plurality of circumferentially spaced cavities in the outer periphery thereof adapted to be positioned adjacent portions of the card flat chain, each of said cavities having a wick therein, said lubricating sprocket also having a plurality of radially extending passageways connecting said internal groove with said cavities, said housing having a first passageway therein communicating with said reservoir and with said bore extending through the housing, said sleeve portion of said sprocket assembly having second and third passageways therein adapted at spaced intervals of time to register with said first passageway to permit lubricant to flow into said radially extending passageways in said lubricating sprocket for delivery onto said card flat chain, and a needle valve in said first passageway in said housing for controlling the amount of lubricant flowing therethrough.

References Cited in the file of this patent

UNITED STATES PATENTS

| Number | Name | Date |
|---|---|---|
| 807,731 | Dodge | Dec. 19, 1905 |
| 1,186,434 | Pierce | June 6, 1916 |
| 1,933,464 | West | Oct. 31, 1932 |

FOREIGN PATENTS

| Number | Country | Date |
|---|---|---|
| 419,480 | Great Britain | Nov. 13, 1934 |